United States Patent
Kennedy et al.

(10) Patent No.: US 7,974,633 B2
(45) Date of Patent: Jul. 5, 2011

(54) SYSTEM AND METHOD FOR SINGLE SENSOR GEOLOCATION

(75) Inventors: Joseph P. Kennedy, Great Falls, VA (US); John P. Carlson, Dulles, VA (US)

(73) Assignee: Andrew, LLC, Hickory, NC (US)

( * ) Notice: Subject to any disclaimer, the term of this patent is extended or adjusted under 35 U.S.C. 154(b) by 830 days.

(21) Appl. No.: 11/505,950

(22) Filed: Aug. 18, 2006

(65) Prior Publication Data

US 2008/0045235 A1     Feb. 21, 2008

(51) Int. Cl.
*H04W 24/00*     (2009.01)

(52) U.S. Cl. ............... 455/456.1; 455/456.3; 455/456.4; 455/456.5; 455/456.6

(58) Field of Classification Search ............. 342/357.02; 455/456.1–456.8
See application file for complete search history.

(56) References Cited

U.S. PATENT DOCUMENTS

| | | | |
|---|---|---|---|
| 5,327,144 A * | 7/1994 | Stilp et al. ............. | 342/387 |
| 6,233,459 B1 | 5/2001 | Sullivan et al. | |
| 6,289,280 B1 | 9/2001 | Fernandez-Corbaton et al. | |
| 6,570,529 B2 | 5/2003 | Richton et al. | |
| 6,950,664 B2 | 9/2005 | Chen et al. | |
| 7,031,727 B2 | 4/2006 | Baskin | |
| 2003/0011511 A1* | 1/2003 | King et al. ............. | 342/357.02 |
| 2004/0152471 A1* | 8/2004 | MacDonald et al. ...... | 455/456.1 |

* cited by examiner

*Primary Examiner* — Pierre-Louis Desir
*Assistant Examiner* — Joshua Schwartz
(74) *Attorney, Agent, or Firm* — Duane Morris, LLP

(57) ABSTRACT

A system and method for determining a position of a wireless mobile device. The method comprising the steps of providing one base station in communication with the mobile device, providing a sensor spaced apart a known distance from the base station, and determining the range between the mobile device and the base station. The time of arrival of a signal transmitted from the mobile device is measured at the sensor and a set of coordinates is calculated for the mobile device relative to the sensor as a function of the known distance from the sensor to the base station, the range between the mobile device and the base station, an estimate of base station transmission timing relative to a time source, and the time of arrival. One of the set of coordinates may then be chosen to thereby determine a position of the mobile device relative to the sensor.

44 Claims, 3 Drawing Sheets

SYSTEM AND METHOD FOR SINGLE SENSOR GEOLOCATION

BACKGROUND

The structure and operation of wireless communication systems are generally known. Examples of such wireless communication systems include cellular systems and wireless local area networks. Equipment deployed in these communication systems is typically built to support standardized operating standards that prescribe particular carrier frequencies, modulation types, baud rates, physical layer frame structures, MAC layer operations, link layer operations, etc.

In a cellular system, a regulatory body typically licenses a frequency spectrum for a corresponding service area utilized by a licensed system operator to provide wireless service within the service area. Based upon the licensed spectrum and the operating standards employed for the service area, the system operator deploys a plurality of carrier frequencies, i.e., channels, within the frequency spectrum that support the subscriber units within the service area. Typically, these channels are equally spaced across the licensed spectrum. The separation between adjacent carriers may be defined by the operating standards and is selected to maximize the capacity supported within the licensed spectrum without excessive interference. In most cases, severe limitations are placed upon the amount of co-channel and adjacent channel interference that may be caused by transmissions on a particular channel.

In a cellular system, a plurality of base stations may be distributed across the service area. Each base station services wireless communications within a respective cell. Each cell may be further subdivided into a plurality of sectors. In many cellular systems, e.g., Global System for Mobile Communications (GSM) cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most cellular systems, carrier frequencies are reused so that interference between base stations using the same carrier frequencies is minimized and system capacity is increased. Typically, base stations using the same carrier frequencies are geographically separated so that minimal interference results.

Traditional wireless mobile networks include mobile switching centers (MSCs), base station controllers (BSCs) and base stations that jointly operate to communicate with mobile stations over a wireless communication link. Examples of common networks include the GSM networks, North American Time Division Multiple Access (TDMA) networks and Code Division Multiple Access (CDMA) networks. Extensive infrastructures (e.g., ANSI-41 or MAP-based networks) exist in the cellular wireless networks for tracking mobility, distributing subscriber profiles, and authenticating physical devices. In wireless mobile networks providing a facility to determine a mobile device's geographic position, a network component commonly referred to as a mobile location center (MLC) or geolocation subsystem (GLS) performs a location calculation.

To establish a wireless communication link in traditional wireless voice networks, an MSC communicates with a BSC to prompt the base station to generate paging signals to a specified mobile device within a defined service area, i.e., a cell or a sector. The mobile device, upon receiving the page request, provides a response indicating it is present and available to accept an incoming call. Thereafter, the base station, upon receiving a response from the mobile device, communicates with the MSC to advise the MSC of the same. The call may then routed through the base station to the mobile device as the call setup is completed and the communication link is created. Alternatively, to establish a call, a mobile device generates call setup signals that are processed by various network elements in a synchronized manner to authenticate the user as a part of placing the call. The authentication process may include, for example, communicating with a Home Location Register (HLR) to obtain user and terminal profile information. The HLR is a central database that stores the permanent parameters of the user including additional services, the encryption keys for digital signal transmission, and the address of a Visitor Location Register (VLR) database. The VLR database contains information associated with the mobile device's current location including the serving base station.

In 1996, the Federal Communications Commission (FCC) issued a report and order requiring all wireless carriers and mobile phone manufacturers to provide a capability for automatically identifying to emergency dispatchers the location from which a wireless call was made. Implementation is divided into two phases. Phase I requires wireless service providers and mobile phone manufacturers to report the telephone number of the mobile device making the call as well as the base station servicing the mobile device which provided a general area from which the call was made. This information can be obtained from the network elements. Phase II of the FCC's Enhanced 911 (E-911) mandate states that by Oct. 1, 2002, wireless service providers must be able to pinpoint, by latitude and longitude, the location of a subscriber who calls emergency 911 from a mobile device. Wireless service providers were given the option of providing a network-based solution or a handset based solution.

One known method for locating a mobile device is triangulation. Signal power level or signal timing measurements between the mobile device and three or more base stations may be used to triangulate. Signal power levels or signal timing measurements may be used to estimate the distance between each base station and the mobile device. The distances are plotted to determine a point of intersection, and the point of intersection is the approximate transmitter location. For calculations using only signal power measurements, this method works only when the signal strength is relatively strong and not greatly affected by radio frequency (RF) fading, such as multi-path interference. RF fading occurs when radiated signals encounter various obstacles that reflect and diffract the signal causing the received signal power level at the base station and mobile device to vary. The requirement for a minimum of three base stations and the effect of RF fading limits the usefulness of triangulation.

Location techniques relying on measurements of timing differences, such as time difference of arrival (TDOA) or enhanced observed time difference (E-OTD), require signal timing measurements between the mobile device and three or more separate base stations. If the wireless network's base stations are not synchronized, then additional equipment is required at each base station to measure the timing difference between base stations in the network. If the wireless network is not capable of collecting signal timing measurements between three or more base stations and the mobile device, modification of the base station, and optionally the handset, are required. The modification of base stations and/or handsets implies significant additional cost to wireless network operators.

The Global Positioning System (GPS) provides a means to fix a position of a transmitter using a system of orbiting satellites with orbital planes that guarantee at least four satellites are visible at all times. This system provides location accuracy to within one meter for military systems possessing a Selective Availability (SA) algorithm to filter out the intentional noise added to the signal. GPS systems without SA are limited to an accuracy of approximately 100 meters. Widespread use of the GPS and the decision to discontinue the LORAN-C navigation system convinced the Department of Defense to drop SA thereby allowing commercial GPS receivers to dramatically increase accuracy. The FCC recognized that GPS receivers could be incorporated into mobile phones when it made minor adjustments to the Phase II schedule. Using GPS to report location, however, requires a mobile device user to upgrade existing hardware or to purchase new hardware and/or software. One of the largest obstacles to implementing such a system is large costs associated with deploying and maintaining necessary hardware and software needed to bring this technology into use.

Thus, there exists a need in the art for a method and system to calculate a mobile device's location that avoids the limitations of the prior art while limiting the impact to users and to network operators. The geographic location of active wireless mobile devices in a network is of great interest for fulfillment of the FCC E-911 regulations, and necessary for offering location based services. Embodiments of the present subject matter address the cost and complexity issue by offering a novel method of locating wireless users using measurements from only a single wireless sensor device. Thus, embodiments of the present subject matter offer cost and complexity advantages over conventional network-overlay location methods such as TDOA, E-OTD and Angle of Arrival (AOA) that rely on signal reception and measurement from multiple sensors to locate mobile devices.

Accordingly, it is an object of the present subject matter to obviate many of the deficiencies in the prior art and to provide a novel method of locating a position of a mobile device using a sensor spaced apart a known distance from a base station in communication with the mobile device where the mobile device provides a signal transmission. The method further comprises calculating and choosing a set of coordinates for the mobile device relative to the sensor as a function of the known distance from the sensor to the base station, a range between the mobile device and the base station, an estimate of base station transmission timing relative to a time source known at the sensor, and a time of arrival of the signal transmission at the sensor.

It is also an object of the present subject matter to provide a novel method for determining a position of a wireless mobile device comprising the steps of providing one base station in communication with the mobile device, providing a sensor spaced apart a known distance from the base station, and determining the range between the mobile device and the base station. The method further comprises the steps of measuring the time of arrival at the sensor of a signal transmitted from the mobile device, calculating a set of coordinates for the mobile device relative to the sensor as a function of the known distance from the sensor to the base station, the range, an estimate of base station transmission timing relative to a time source known at the sensor, and the time of arrival, and choosing a one of the set of coordinates to thereby determine a position of the mobile device relative to the sensor.

It is a further object of the present subject matter to provide a novel system for locating a position of a mobile device. The system comprises a mobile location center in communication with a network having at least one sensor spaced apart a known distance from a base station in communication with the mobile device, the mobile device providing a signal transmission. The mobile location center calculates and chooses a set of coordinates for the mobile device relative to the sensor as a function of the known distance from the sensor to the base station, a range between the mobile device and the base station, an estimate of base station transmission timing relative to a time source known at the sensor, and a time of arrival of the signal transmission at the sensor.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE FIGURES

The principles of the disclosure will be discussed in relation with the exemplary and non-exclusive embodiments, in which.

DETAILED DESCRIPTION OF THE FIGURES

With reference to the figures where like elements have been given like numerical designations to facilitate an understanding of the present subject matter, the various embodiments of a system and method for single sensor geolocation of a mobile device are described.

Figure 1:
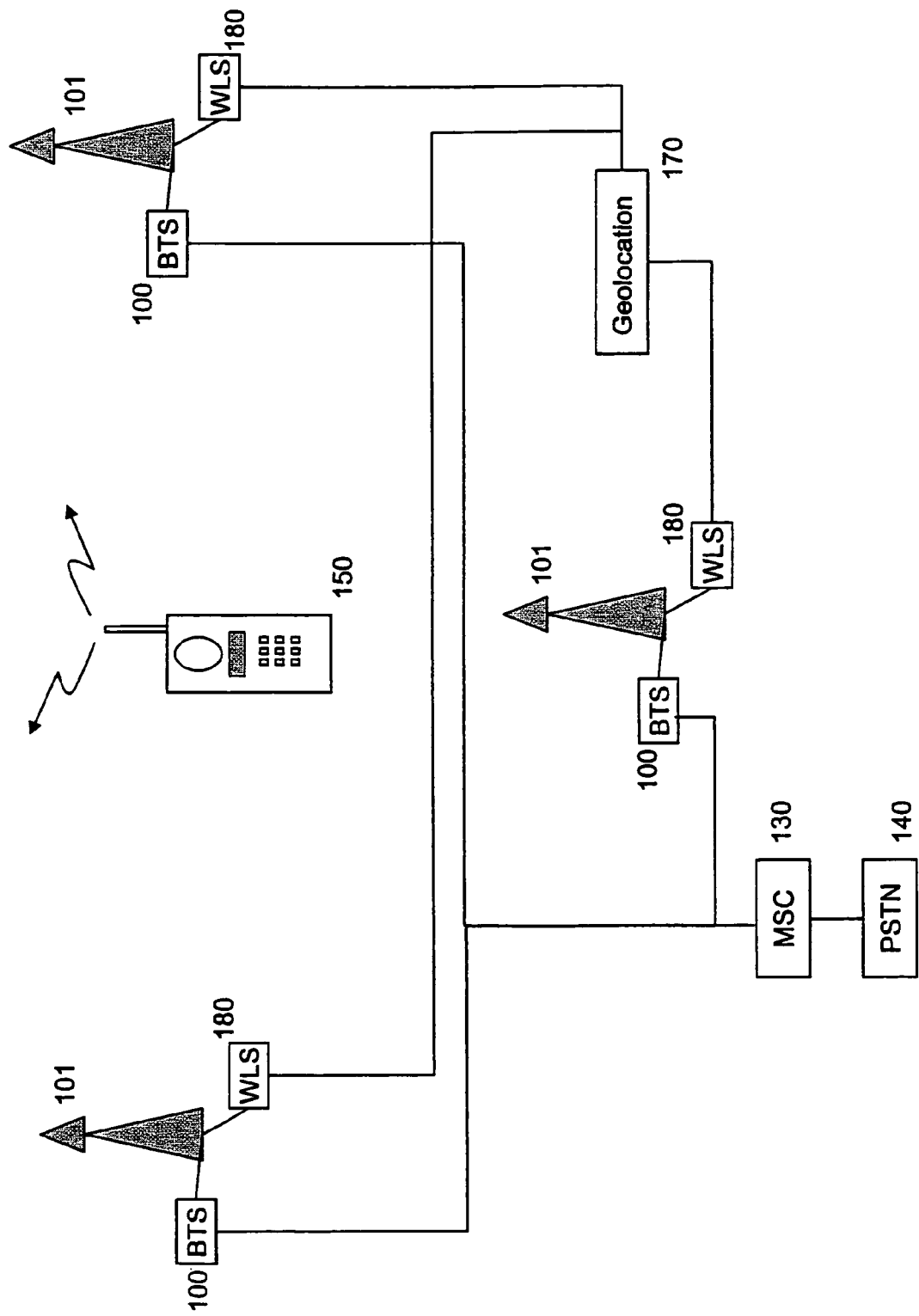
FIG. 1 is a schematic representation of a conventional geolocation system integrated with a communication infrastructure.

FIG. 1 is a schematic representation of a conventional geolocation system integrated with a communication infrastructure. With reference to FIG. 1, a typical prior art mobile communication system is depicted including three base stations 100 each with an associated antenna 101. The base stations are connected to a mobile switching center (MSC) 130 which is an interface between the mobile communication system and a public switched telephone network (PSTN) 140. The disclosed principles may operate in any mobile communication system with any number of base stations and are not limited to a system with three base stations as illustrated in FIG. 1.

The antennas 101 transmit and receive communication and beacon signals to wireless mobile device 150. The mobile device 150 may include, for example, a wireless transmitter, radio frequency transmitter, mobile telephone, cellular or mobile telephone, text messaging device, portable computer, laptop computer, personal digital assistant, vehicle security device, vehicle tracking device, and pager.

A typical geolocation subsystem (GLS) 170 interfaces with the cellular communication network to retrieve the identity of the user derived from standard base station equipment and the assigned channels. Conventional geolocation subsystems use this information for estimating the position of mobile device 150. It should be noted, however, that the disclosed inventive system and method for locating a mobile device may use a network overlay such that one or more wireless location sensors 180 receive a signal from the mobile device 150 including a known sequence or sequences, and compute a location measurement based on an attribute or characteristic of the mobile device's signal. Such attributes may include, among others, time of arrival (TOA), angle of arrival (AOA), time difference of arrival (TDOA), received power level, timing advance, signal strength, signal-to-noise ratio, bit error rate, etc. The disclosed system and method can equally operate with other such attributes of the mobile device's signal as are known in the art. The geolocation network overlay can be independent of the infrastructure or the wireless communication system. Also, the sensor and the associated antennas may be at different locations or co-located with the base station utilizing common towers or other shared components.

Figure 2:
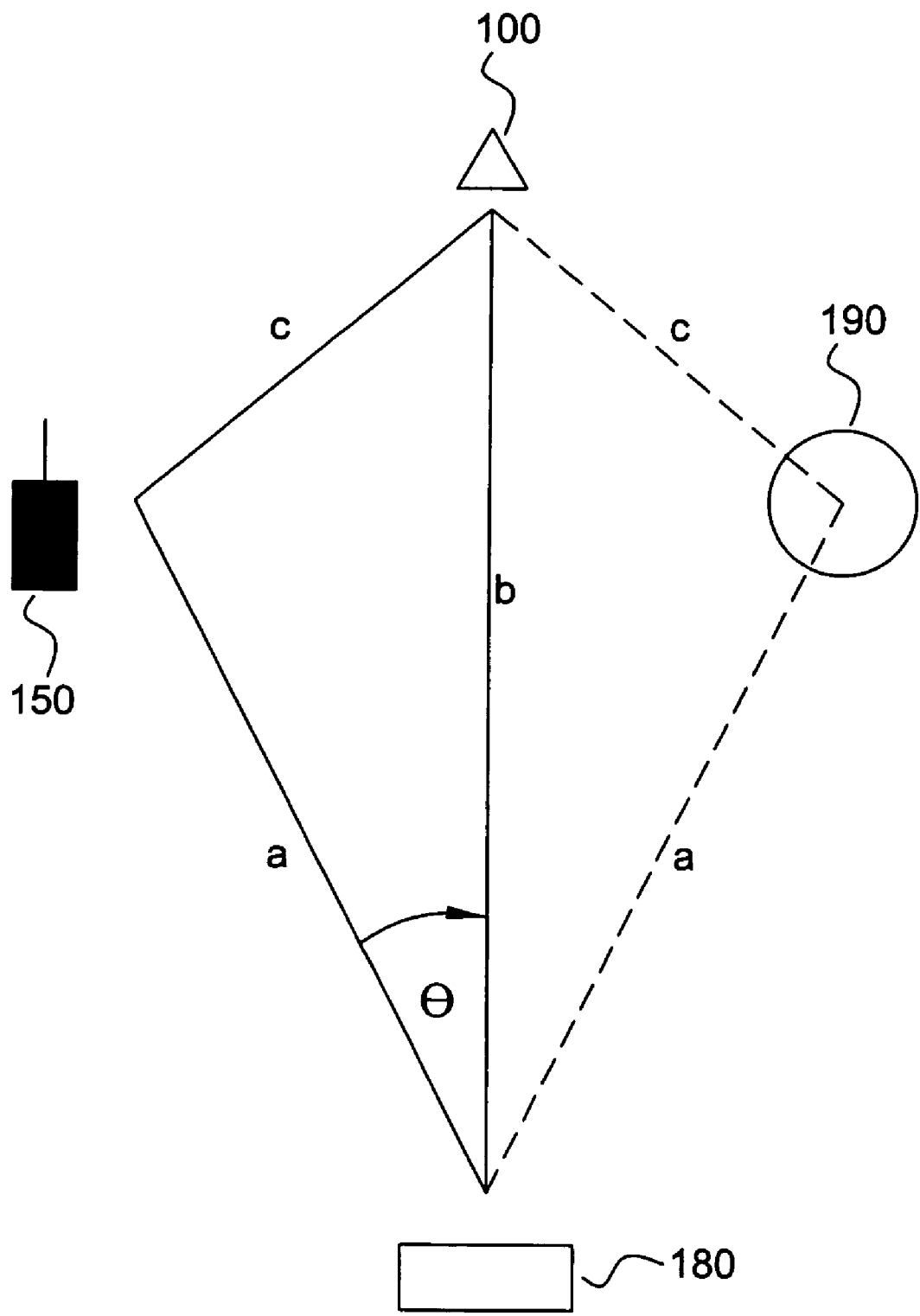
FIG. 2 is a representation of an embodiment for locating a mobile device by a single sensor according to the present subject matter.

FIG. 2 is a representation of an embodiment for locating a mobile device by a single sensor according to the present subject matter. With reference to FIG. 2, a sensor 180 may be positioned in a location that is both physically separate from the base station 100 serving the mobile device 150 and close enough to the mobile device 150 that the sensor 180 is capable of measuring transmissions therefrom. The distance from the base station 100 serving the mobile device 150 and the sensor 180 is represented as b. The range to the mobile device 150 from the base station 100 is represented as c. The range to the mobile device 150 from the sensor 180 is represented as a, whereby the position of the mobile device 150 may be offset from b by an angle θ. While the angle θ is illustrated in FIG. 2 as an acute angle, the angle θ may be obtuse and such depiction is not meant to limit the scope of the claims appended herewith.

Thus, the position of the mobile device may be calculated utilizing the law of cosines:

$$c^2 = a^2 + b^2 - 2ab \cos(\theta) \quad (1)$$

Generally, b is a known variable. The variable c may be determined by the knowledge of the timing advance (TA) utilized by the mobile device 150. The TA may be determined from the signal transmission from the mobile device 150, provided by the sensor 180, or may be provided by other components in or connections with the network. For example, the TA may be provided by an Lb, Lbis, or Abis interface. The variable a may be determined as a function of the time of arrival of a transmission by the mobile device 150 as measured at the sensor 180. While a may be illustrated as possessing a value less than b, such a depiction is not intended to limit the scope of the claims appended herewith and values of a may be greater than or equal to values of b in alternative embodiments of the present subject matter.

Equation (1) may be rearranged to determine the angle θ as follows:

$$\theta = \cos^{-1}\left\{ \frac{(a^2 + b^2 - c^2)}{2ab} \right\} \quad (2)$$

Placing a coordinate origin at the position of the sensor 180, the x coordinate of the mobile device 150 may be determined from the following relationship:

$$x = \pm a \sin\left[ \cos^{-1}\left\{ \frac{(a^2 + b^2 + c^2)}{2ab} \right\} \right] \quad (3)$$

The y coordinate of the mobile device 150 may be determined from the following relationship:

$$y = \sqrt{a^2 - x^2} \quad (4)$$

It should be noted that Equation (3) contains an ambiguity point 190 that must be resolved. Resolution of the ambiguity point 190 may be determined by several exemplary methods. For example, the TA utilized by the mobile device 150 may assist in eliminating the ambiguity point 190. Further, utilizing knowledge of sector orientations of the serving sector, an ambiguity point 190 may lie outside of the coverage area of the serving sector, and may therefore be eliminated as a candidate. Additionally, the latitude and longitude of the sensor and/or may be determined to assist in providing a position of the mobile device 150.

In another embodiment of the present subject matter, the mobile device 150 may periodically send downlink signal strength, or other quality measurements such as signal-to-noise ratio, bit error rate and received power level, e.g., received power level to the serving and neighbor base stations received by the mobile device, made from surrounding base stations. This is typically done in most wireless communication protocols to assist the network in choosing an optimum base station for mobile hand-off. If access to these measurement reports are available, either directly from network interfaces or captured over the air, then an ambiguity point may be eliminated. For example, the ambiguity point 190 may be eliminated with knowledge of the positions of other nearby base stations combined with the received signal strength of their downlink signals as observed or measured by the mobile. Utilizing this information, an ambiguity point may be less likely than the other and may thus be eliminated.

In a further embodiment of the present subject matter, a sensor 180 may be equipped with an antenna system (not shown) providing an indication of directionality, such as a single narrow azimuth antenna or a fixed switch beam antenna. For example, if the angular separation of the two points sufficiently exceeds an azimuth of the directional antenna, then the ambiguity point 190 may be eliminated based on a coarse knowledge of the angle of arrival of a signal provided by the mobile device 150. In an alternative embodiment, a directional antenna may be rotated to thereby calculate the mobile device's signal energy versus arrival angle and thus provide a basis for excluding the ambiguity point 190. Additionally, embodiments of the present subject matter may resolve the ambiguity point 190 by utilizing mobile assisted handoff information or enhanced cell identification data.

Embodiments of the present subject matter may implement a control mechanism to adjust the transmission timing of the mobile device 150 to ensure that the wireless communications network is aware of the timing adjustment utilized by the mobile device 150. For example, in a Global System for Mobile Communications (GSM) network, timing advance (TA) may be utilized to control the timing of mobile transmissions in order to properly align the reception of transmission bursts at the serving base station 100. This is particularly important in TDMA networks where the collisions from different mobile devices operating in adjacent timeslots on the same frequency must be minimized. In a GSM network, a TA adjustment utilized by the mobile device 150 may be continuously transmitted to the network. Additionally, the sensor 180 must also have knowledge of the underlying transmission timing of the serving base station 100, calculated either by a common time base synchronization means, e.g., GPS or Pulse Code Modulated signal, or by directly measuring a mobile device's signal transmission timing and computing a time offset from a time source or time base used in the sensor 180.

For example, if the base station timing is derived through GPS, and the sensor 180 has a precise knowledge of GPS time through its own GPS clock, then the timing of the base station 100 is considered to be known by the sensor 180. In an alternative embodiment, if the timing of the base station employs a clock independent of GPS time and the sensor 180 uses GPS time as its own reference clock, then the sensor 180 may compute a relationship between the two clocks by measuring a base station transmission from over-the-air messaging. This approach may require that the sensor 180 be positioned in sufficient proximity to the serving base station 100 such that it may measure the base station transmission and determine a relationship between the two timing sources. Of course, the sensor 180 may be located at a second base station.

Thus, given the constraints of the communications network type and the position of the sensor 180, embodiments of the present subject matter may locate the position of a mobile device 150 using a single sensor 180 provided that the mobile device's timing adjustment is also known. For example, in a GSM network, the TA parameter may be measured directly by the sensor 180 by receiving and decoding the transmitted TA field on uplink signals. Knowledge of the TA currently in use by the mobile device 150 may also be made available from components in or connections with the communications network. For example, knowledge of the TA may be provided to the underlying communications network by an Lb, Lbis, or Abis data interface.

While embodiments of the present subject matter have been described with reference to a GSM network, such is not intended to limit the scope of the claims appended herewith. For example, embodiments of the present subject matter are equally applicable to wireless communication protocols such as IS-136, IS-95, CDMA2000, UMTS, etc. In GSM, IS-136 and similar networks, the TA parameter contains the aforementioned timing data. In IS-95, CDMA2000, UMTS and similar networks, timing information may be derived from observed arrival times of the downlink broadcast signals as measured by the mobile and relayed back to the network.

Figure 3:
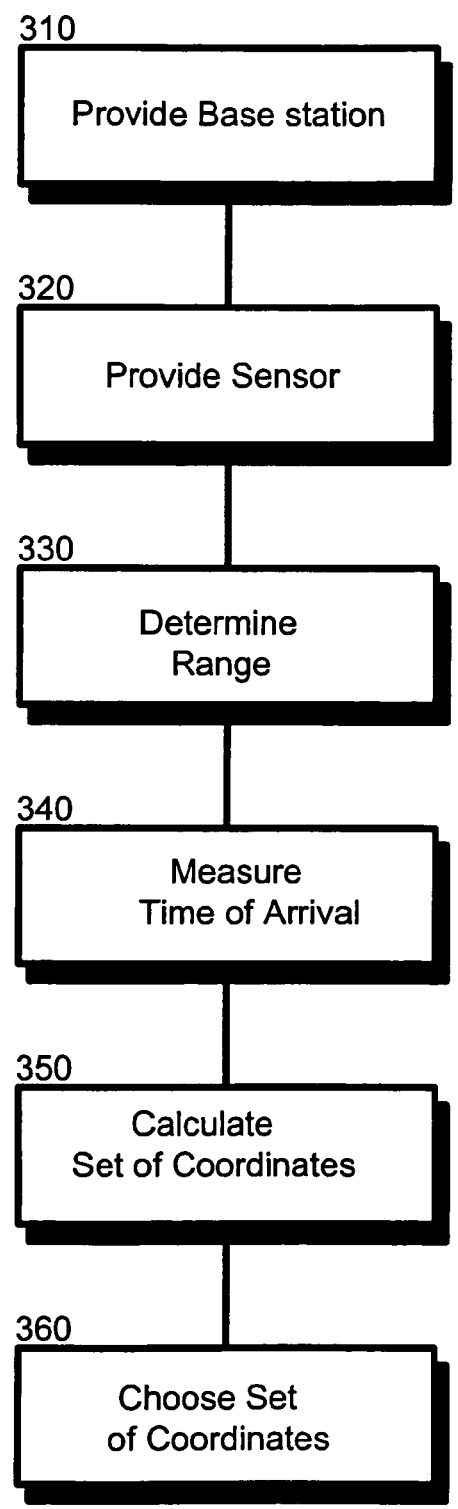
FIG. 3 illustrates a representative flow chart for determining a position of a wireless mobile device according to an embodiment of the present subject matter.

FIG. 3 illustrates a representative flow chart for determining a position of a wireless mobile device according to an embodiment of the present subject matter. As represented by block 310, a base station may be provided in communication with a mobile device. A sensor may also be provided spaced apart a known distance from the base station as shown by block 320. As represented by blocks 330 and 340, the range between the mobile device and the base station is determined, and the time of arrival of a signal transmitted from the mobile device is measured at the sensor, respectively. The range may be determined as a function of timing advance, or may be calculated by a common time base synchronization means, i.e., GPS, or by a relationship between the common time base means and an independent clock. A set of coordinates for the mobile device is calculated relative to the sensor as a function of the known distance from the sensor to the base station, the range, an estimate of base station transmission timing relative to a time source known at the sensor, and the time of arrival as shown by block 350. As represented by block 360, one of the set of coordinates may be chosen to thereby determine a position of the mobile device relative to the sensor. Any ambiguity in the set of coordinates may be determined from quality measurements made from a second base station such as signal strength, signal-to-noise ratio, bit error rate or received power level. Any ambiguity may also be resolved as a function of sector orientation of the serving sector, an arrival time of a downlink broadcast signal as measured by the mobile device, timing advance, or other methods previously described.

An exemplary system and method of location a position of a mobile device according to an embodiment of the present subject matter utilizes a sensor spaced apart a known distance form a base station in communication with the mobile device. Upon receiving a transmission from the mobile device, the system calculates and chooses a set of coordinates for the mobile device relative to the sensor as a function of the known distance from the sensor to the base station, a range between the mobile device and the base station, an estimate of base station transmission timing relative to a time source, and a time of arrival of the signal transmission at the sensor. In alternative embodiments, the latitude and longitude of the sensor or serving base station may be determined to thereby determine the geolocation of the mobile device. Any ambiguity in the set of determined coordinates may be determined from quality measurements made from a second base station such as signal strength, signal-to-noise ratio, bit error rate or received power level. Of course, any ambiguity may be resolved as a function of sector orientation of the serving sector, an arrival time of a downlink broadcast signal as measured by the mobile device, timing advance, or other methods previously described.

An exemplary system and method for determining a position of a mobile device according to another embodiment of the present subject matter includes at least one base station in communication with the mobile device and a sensor spaced apart from the base station a known distance. The range between the mobile device and the base station may be determined and the time of arrival of a transmitted signal from the mobile device is measured at the sensor. Of course, the range may be determined as a function of timing advance, or may be calculated by a common time base synchronization means, i.e., GPS, or by a relationship between the common time base means and an independent clock. Thus, an exemplary network may calculate a set of coordinates for the mobile device relative to the sensor as a function of the known distance from the sensor to the base station, the range, an estimate of base station transmission timing relative to a time source known at the sensor, and the time of arrival. Further, the network may select one of the set of coordinates to thereby determine a position of the mobile device relative to the sensor. In alternative embodiments, the latitude and longitude of the sensor or serving base station may be determined to thereby determine the geolocation of the mobile device. Any ambiguity in the set of determined coordinates may be determined from quality measurements made from a second base station such as signal strength, signal-to-noise ratio, bit error rate or received power level. Any ambiguity may also be resolved as a function of sector orientation of the serving sector, an arrival time of a downlink broadcast signal as measured by the mobile device, timing advance, or other methods previously described.

As shown by the various configurations and embodiments illustrated in FIGS. 1-3, a system and method for locating the position of a mobile device using a single sensor have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. In a method of locating a position of a mobile device using a sensor spaced apart a known distance from a base station in communication with the mobile device, the mobile device providing a signal transmission, the improvement comprising calculating and choosing a set of coordinates for the mobile device relative to the sensor as a function of:

the known distance from the sensor to the base station, a range between the mobile device and the base station, an estimate of base station transmission timing relative to a time source known at the sensor, and a time of arrival of the signal transmission of said mobile device at the sensor, wherein the step of calculating a set of coordinates for the mobile device comprises determining the x coordinate from the following relationship:

$$x = \pm a\sin\left[\cos^{-1}\left\{\frac{(a^2 + b^2 - c^2)}{2ab}\right\}\right]$$

wherein a is a function of the time of arrival measured at the sensor, b is the known distance from the sensor to the base station, and c is the range between the mobile device and the base station.

2. The method of claim 1 further comprising the step of determining the latitude and longitude of the sensor to thereby determine the geolocation of the mobile device.

3. The method of claim 1 further comprising the step of determining the latitude and longitude of the base station to thereby determine the geolocation of the mobile device.

4. The method of claim 1 wherein the range is less than the known distance.

5. The method of claim 1 wherein the sensor is located at a second base station.

6. The method of claim 1 wherein the step of calculating a set of coordinates for the mobile device comprises determining the y coordinate from the following relationship:

$$y = \sqrt{a^2 - x^2}.$$

7. The method of claim 1 wherein the range between the mobile device and the base station is determined from a timing advance of the signal transmission of the mobile device.

8. The method of claim 7 wherein the timing advance is provided by the sensor.

9. The method of claim 7 wherein the timing advance is provided by an interface selected from the group consisting of: Lb, Lbis, and Abis interface.

10. The method of claim 1 wherein one of the set of coordinates is chosen as a function of a sector orientation of a serving sector.

11. The method of claim 1 wherein one of the set of coordinates is chosen as a function of a quality measurement made from a second base station.

12. The method of claim 11 wherein the quality measurement is selected from the group consisting of: signal strength, signal to noise ratio, bit error rate, and received power level.

13. The method of claim 12 wherein the received power level is a received power level to the serving and neighbor base stations received by the mobile device.

14. The method of claim 1 wherein one of the set of coordinates is chosen as a function of timing advance.

15. A method for determining a position of a wireless mobile device comprising the steps of:
(a) providing one base station in communication with the mobile device;
(b) providing a sensor spaced apart a known distance from the base station;
(c) determining the range between the mobile device and the base station;
(d) measuring the time of arrival at the sensor of a signal transmitted from the mobile device;

(e) calculating a set of coordinates for the mobile device relative to the sensor as a function of the known distance from the sensor to the base station, the range, an estimate of base station transmission timing relative to a time source known at the sensor, and the time of arrival of the signal transmitted from the mobile device; and
(f) choosing a one of the set of coordinates to thereby determine a position of the mobile device relative to the sensor, wherein the step of calculating a set of coordinates for the mobile device comprises determining the x coordinate from the following relationship:

$$x = \pm a\sin\left[\cos^{-1}\left\{\frac{(a^2 + b^2 - c^2)}{2ab}\right\}\right]$$

wherein a is a function of the time of arrival measured at the sensor, b is the known distance from the sensor to the base station, and c is the range between the mobile device and the base station.

16. The method of claim 15 further comprising the step of determining the latitude and longitude of the sensor to thereby determine the geolocation of the mobile device.

17. The method of claim 15 further comprising the step of determining the latitude and longitude of the base station to thereby determine the geolocation of the mobile device.

18. The method of claim 15 wherein the range is less than the known distance.

19. The method of claim 15 wherein the sensor is located at a second base station.

20. The method of claim 15 wherein the step of calculating a set of coordinates for the mobile device comprises determining the y coordinate from the following relationship:

$$y = \sqrt{a^2 - x^2}.$$

21. The method of claim 15 wherein one of the set of coordinates is chosen as a function of a sector orientation of a serving sector.

22. The method of claim 15 wherein one of the set of coordinates is chosen as a function of a quality measurement made from a second base station.

23. The method of claim 22 wherein the quality measurement is selected from the group consisting of: signal strength, signal to noise ratio, bit error rate, and received power level.

24. The method of claim 23 wherein the received power level is a received power level to the serving and neighbor base stations received by the mobile device.

25. The method of claim 15 wherein one of the set of coordinates is chosen as a function of mobile assisted handoff information.

26. The method of claim 15 wherein one of the set of coordinates is chosen as a function of enhanced cell identification data.

27. The method of claim 15 wherein one of the set of coordinates is chosen as a function of timing advance.

28. The method of claim 15 wherein one of the set of coordinates is chosen as a function of the angle of arrival of the transmission from the mobile device.

29. The method of claim 15 wherein the range is determined as a function of timing advance.

30. The method of claim 29 wherein the mobile device is operating in a GSM or an IS-136 communication system.

31. The method of claim 30 wherein the timing advance is provided by the sensor.

32. The method of claim 30 wherein the timing advance is provided by an interface selected from the group consisting of: Lb, Lbis, and Abis interface.

33. The method of claim 15 wherein the mobile device is operating in an IS-95, a CDMA2000, or a UTMS communication system.

34. The method of claim 15 wherein the arrival time of the downlink broadcast signal is measured by the mobile device.

35. The method of claim 15 wherein the step of determining the range further comprises calculating the range by a common time base synchronization means.

36. The method of claim 15 wherein the step of determining the range further comprises computing a relationship between an independent clock and a common time base synchronization means.

37. The method of claim 15 wherein the mobile device is selected from the group consisting of: wireless transmitter, radio frequency transmitter, mobile telephone, cellular phone, text messaging device, portable computer, laptop computer, personal digital assistant, vehicle security device, vehicle tracking device, and pager.

38. A system for locating a position of a mobile device comprising a mobile location center in communication with a network having at least one sensor spaced apart a known distance from a base station in communication with the mobile device, the mobile device providing a signal transmission wherein the mobile location center calculates and chooses a set of coordinates for the mobile device relative to the sensor as a function of:
   (i) the known distance from the sensor to the base station;
   (ii) a range between the mobile device and the base station;
   (iii) an estimate of base station transmission timing relative to a time source known at the sensor; and
   (iv) a time of arrival of the signal transmission from the mobile device at the sensor,
wherein the set of coordinates for the mobile device comprises an x coordinate determined from the following relationship:

$$x = \pm a \sin\left[\cos^{-1}\left\{\frac{(a^2 + b^2 - c^2)}{2ab}\right\}\right]$$

wherein a is a function of the time of arrival measured at the sensor, b is the known distance from the sensor to the base station, and c is the range between the mobile device and the base station.

39. The system of claim 38 wherein the range is less than the known distance.

40. The system of claim 38 wherein the sensor is located at a second base station.

41. The system of claim 38 wherein the network is selected from the group consisting of: GSM, IS-136, IS-95, CDMA2000, and UTMS network.

42. The system of claim 38 further comprising an interface selected from the group consisting of: Lb, Lbis, and Abis interface.

43. The system of claim 42 wherein said interface provides a timing advance to said mobile location center.

44. The system of claim 38 wherein the mobile device is selected from the group consisting of: wireless transmitter, radio frequency transmitter, mobile telephone, cellular phone, text messaging device, portable computer, laptop computer, personal digital assistant, vehicle security device, vehicle tracking device, and pager.

* * * * *